United States Patent [19]

Panissidi

[11] 4,456,293
[45] Jun. 26, 1984

[54] ARTICLE GRIPPING APPARATUS

[75] Inventor: Hugo A. Panissidi, Boca Raton, Fla.

[73] Assignee: International Business Machines Corporation, Armonk, N.Y.

[21] Appl. No.: 411,113

[22] Filed: Aug. 24, 1982

[51] Int. Cl.³ .............................................. B25J 15/02
[52] U.S. Cl. ................................. 294/106; 294/86 R; 294/88; 414/730; 414/735; 414/739
[58] Field of Search .................. 294/67 BC, 86 R, 88, 294/106, 115, 116; 3/12, 12.6–12.8; 73/862.04; 414/1, 4–7, 729, 730, 735, 738, 739

[56] References Cited

U.S. PATENT DOCUMENTS

| 3,154,339 | 10/1964 | Kaplan | 294/88 |
| 3,904,234 | 9/1975 | Hill et al. | 294/106 |
| 3,948,093 | 4/1976 | Folchi et al. | 73/862.04 |
| 4,132,318 | 1/1979 | Wang et al. | 294/86 R X |
| 4,368,913 | 1/1983 | Brockmann et al. | 294/86 R X |
| 4,423,998 | 1/1984 | Inaba et al. | 414/730 |

FOREIGN PATENT DOCUMENTS

| 568542 | 8/1977 | U.S.S.R. | 294/88 |
| 642151 | 1/1979 | U.S.S.R. | 294/88 |
| 667396 | 6/1979 | U.S.S.R. | 294/106 |
| 709357 | 1/1980 | U.S.S.R. | 294/86 R |
| 812571 | 3/1981 | U.S.S.R. | 294/88 |
| 841962 | 7/1981 | U.S.S.R. | 294/88 |

OTHER PUBLICATIONS

Proceedings of 5th International Symposium on Industrial Robots, 9/22–24/75, p. 335.

Primary Examiner—Johnny D. Cherry
Attorney, Agent, or Firm—Henry E. Otto, Jr.

[57] ABSTRACT

The gripping apparatus described comprises a four-bar linkage arrangement for so controlling movement of the two pairs of parallel beams and fingers operatively connected thereto as to cause the gripping surfaces of the fingers to concurrently move in rectilinearly aligned paths and remain parallel throughout their excursion during gripping and releasing of an article and apply a constant gripping force to the article irrespective of the extent to which the fingers are moved toward each other into gripping contact. The beams are pivotally connected directly at their one ends, and also intermediate their ends via links, to a fixed member; and the beams at their opposite ends have a pin-in-slot connection with the fixed member. When force is applied to the links to operatively cause the fingers to grip the article, the links will rock and the arc described by each beam will be accurately cancelled by the arc generated by each link.

13 Claims, 11 Drawing Figures

ARTICLE GRIPPING APPARATUS

BACKGROUND OF THE INVENTION

This invention relates to apparatus for gripping and transporting articles during performance of work operations thereon or therewith.

In order to be suitable for use in programmable robots, such apparatus must meet the following design criteria:

1. The gripping surfaces of the fingers must remain parallel to each other throughout their full excursion in order to insure against splaying when handling parts of differing dimensions.

2. The gripping surfaces of the fingers must move rectilinearly toward and away from each other so as to maintain a parallel relationship to the surface of the article being attacked.

3. The gripping force exerted by the fingers must be reasonably constant irrespective of the degree to which the fingers are extended when gripping the article.

4. Tactile and feedback sensing means must be provided so that the positions of the fingers will be known at all times and continuously controllable throughout a sequence of complex movements.

U.S. Pat. No. 3,154,339 discloses a pair of parallel finger beams which, by respective links, are constrained to move opposing fingers toward each other with a substantially constant gripping force. However, the gripping surfaces of the fingers do not remain parallel to each other and do not move rectilinearly during their full excursion, and no sensing means is provided. Hence, this patented arrangement fails to meet criteria 1, 2 and 4 above.

Russian Pat. No. 568,542 discloses an arrangement employing a pair of parallel finger beams and associated links for controlling movement of opposing fingers toward and away from each other. With this linkage arrangement, as the finger beams are moved under piston control to displace the fingers toward each other, the amount of gripping force exertable by the fingers does not remain constant; in fact, it can be shown mathematically that the gripping force progressively reduces toward zero as the thickness of the gripped article diminishes. This requires the use of thick pads on the fingers (as shown in phantom in FIG. 1 of this application) if thin articles are to be gripped. Also no sensing means is or can be embodied in this arrangement to provide servo control because of the non-linear relationship between movement of the piston and movement of the gripping fingers. This configuration therefore fails to meet criteria 3 and 4 above.

The Proceedings of the Fifth International Symposium of Industrial Robots, held at the IIT Research Institute on Sept. 22-24, 1975 discloses a number of gripper-type mechanisms. Only one of these, numbered "12" on page 335, is of interest. This mechanism (which is reproduced as FIG. 2 of this application) comprises two sector gears a and three gear racks b and two linear bearings c. This configuration meets all the criteria except 4 above. However, it constitutes a costly, complex mechanism unsuitable for robots because the two gear racks attached to the fingers must be guided by costly linear ball bearings having an aspect ratio of 2:1. As a result, with a finger excursion stroke of eight centimeters, the length of the guide must be approximately three times the stroke or 24 centimeters long. Thus the linear bearings which are needed to support the racks get in the way of the fingers and restrict their mobility and accessibility to close-in work areas. These linear bearings extend outwardly to each side of the fingers and, by analogy, could be considered equivalent to a person, while grasping a ruler wider than the width of his hand, attempting to get into a tight work area.

There is a need for a relatively simple gripper apparatus suitable for programmable robots and meeting all four criteria without interfering with the ability of the fingers to operate effectively in confined spaces.

SUMMARY OF THE INVENTION

According to the invention, an article gripping apparatus which is especially suitable for use in programmable robots, comprises a pair of fingers for gripping the article, and a separate yoke means operatively connected to each finger. Two pairs of parallel beams are provided, those of each pair having their respective one ends pivotally connected to a respective one of the yoke means. A link is pivotally connected to each beam intermediate its ends to permit arcuate movement of that beam relative to a respective pivot point. Two sector gears are provided, each rigidly connected to one of the links associated with one of the beams of each pair. At the opposite end of each of the beams is a pivot pin which has a pin-in-slot connection with fixed means to allow the pivot pin to shift as a function of the radius and angular displacement of the links that are pivotally connected to the fixed means and thereby cancel out the arc generated by the parallel beams. Suitable means controls concurrent arcuate movement of said sector gears for operatively causing the fingers to be moved rectilinearly toward and away from each other. The length of the beams, length and point of connection of the links, and radius of the sector gears are mathematically selected so that the arc described by each set of finger beams is accurately cancelled by the arc generated by the corresponding sector gear link.

With this apparatus, throughout the full excursion of the fingers, the gripping surfaces of the fingers will remain parallel to each other and be displaced in a straight line, and the gripping force exerted by the fingers will be maintained substantially constant irrespective of the degree to which the fingers must be closed to grip the article. The fingers have no laterally extending obstructions associated with them and hence can be moved into relatively small diameter recesses or narrow confined work areas. Tactile and feedback sensors are preferably included to sense and permit control of the positions of the fingers throughout their excursions.

BRIEF DESCRIPTION OF THE DRAWINGS

In order that the invention may be fully understood, a preferred embodiment thereof will now be described with reference to the accompanying drawings, wherein.

DESCRIPTION OF THE PREFERRED EMBODIMENT

FIGS. 3-9

Figure 3:
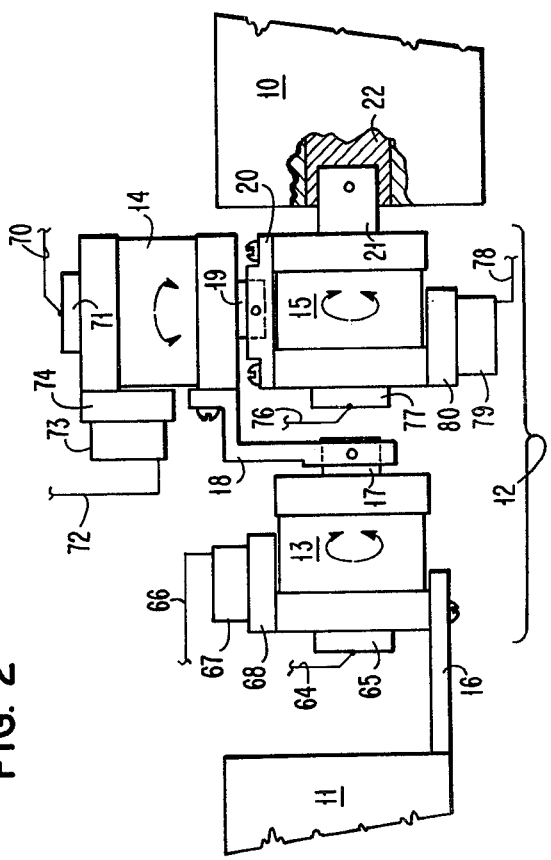
FIG. 3 is a top plan view of a gripper apparatus embodying the invention, including actuators for providing three degrees of freedom for a two-fingered hand assembly.

As shown in FIG. 3, the gripper apparatus embodying the invention comprises a hand assembly 10 driven with three degrees of freedom by an arm 11 acting through a gimbal or wrist assembly 12 comprising three rotary actuators 13, 14, 15.

Arm 11 is movable under programmed computer control in rectilinear steps in X, Y and Z directions to position wrist and hand assemblies 12, 10 in the three rectilinear axes X, Y, Z. Arm 11 is rigidly connected, as by bracket 16, to yaw actuator 13 and supports the wrist and hand assemblies 12, 10.

The output shaft 17 of yaw actuator 13 is screw connected to a bracket 18 secured to pitch actuator 14 for angularly positioning the pitch actuator. The output shaft 19 of the pitch actuator is screw connected to a bracket 20 secured to roll actuator 15 for angularly positioning the roll actuator. The output shaft 21 of the roll actuator is secured to a piston cylinder housing 22 forming part of hand assembly 10, for angularly positioning the hand assembly. Note that the axes of the three polar coordinates generated by these drive actuators 13, 14, 15 intersect at a common point.

Each actuator 13, 14, 15 is of similar configuration and preferably of the conventional rotary type comprising, briefly, a rotatable vane (not shown) subject opposingly to pressures of hydraulic fluid in two chambers separated by a stationary segment-shaped barrier (not shown) that limits the degree of rotation of the vane. The vane of the yaw and roll actuators 13, 15 are connected to the output shafts 17, 21, respectively, to control their specific rotative position within a 270° limited arc; whereas the vane of the pitch actuator is connected to output shaft 19 to control its specific rotative position within a 180° limited arc.

Figure 4:
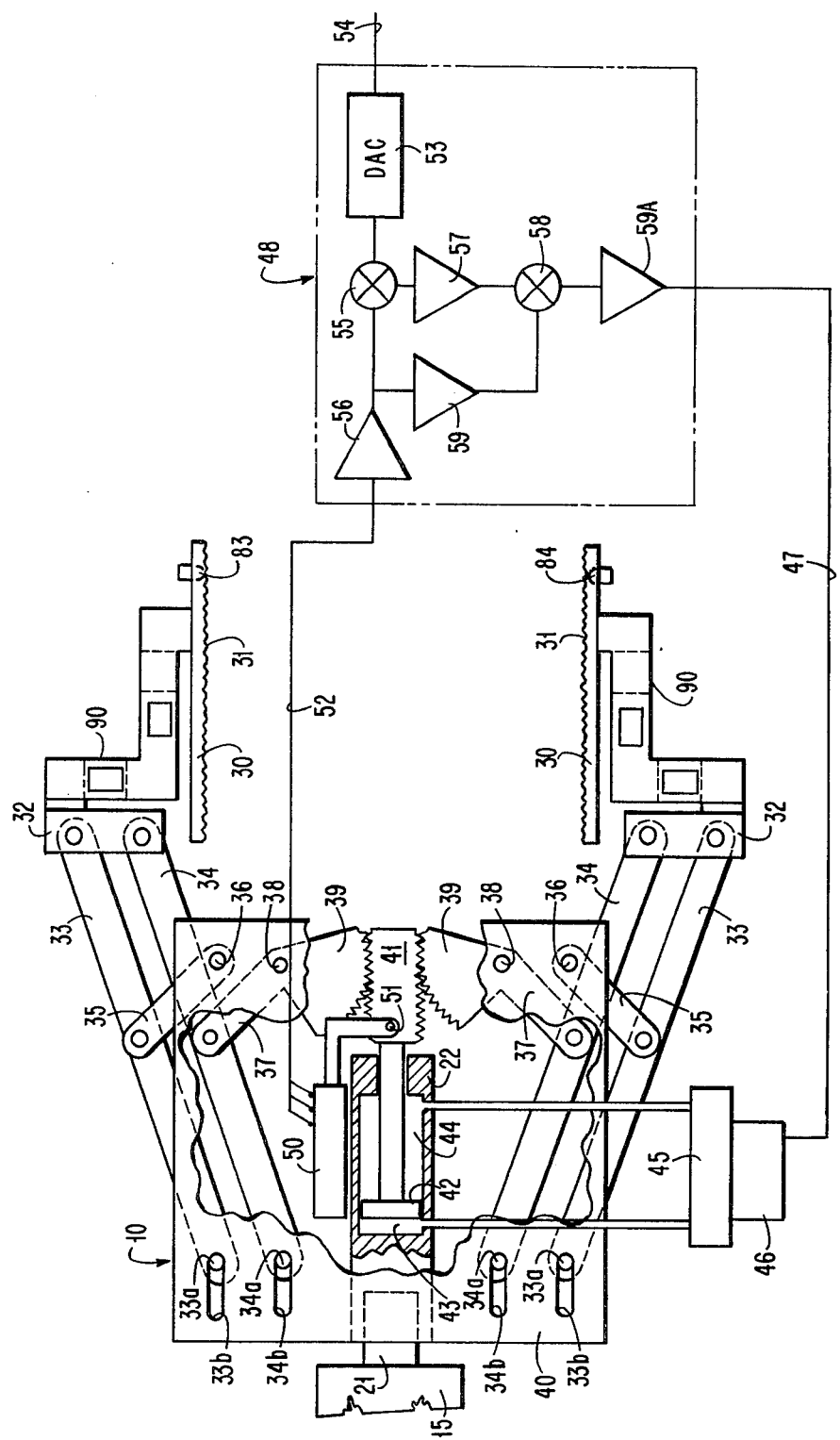
FIG. 4 is a schematic view, partially broken away, and to enlarged scale, to show details of the hand assembly (only the right end of which is shown in outline in FIG. 3) and also show schematically a finger actuator servo control circuit.

As best shown in FIG. 4, and according to an important feature of the invention, the hand assembly 10 comprises a unique four-bar linkage arrangement. More specifically, assembly 10 comprises a pair of fingers 30 having parallel, preferably corrugated, facing surfaces 31 movable rectilinearly toward each other into gripping contact with an article (not shown) that is to be transported to perform a work operation thereon or therewith. Each finger 30 is carried by a flexure structure 90 supported by respective yoke means 32. Two parallel beams 33, 34 are provided for each yoke means 32. Each set of beams 33, 34 at their respective one ends are pivotally connected to a respective one of the yoke means 32. A link 35 is pivotally connected to each beam 33 intermediate its ends to permit arcuate movement of that beam relative to a respective fixed pivot 36. Another link 37 is pivotally connected to each beam 34 intermediate its ends, likewise to permit arcuate movement of that beam relative to a respective fixed pivot 38. Formed integrally with and extending as a part of a leg of each link 37 is a sector gear 39.

At their respective opposite ends, each beam 33, 34 carries a respective pivot pin 33a, 34a that rides in a corresponding slot 33b, 34b to provide a pin-in-slot connection with a fixed support plate 40 of hand assembly 10. The sector gears 39 are disposed at opposite sides of, and mesh with, respective toothed surfaces of a double-faced rack 41. Rack 41 is operatively connected to, and movable translationally by, a piston 42 that is subject opposingly to pressures of hydraulic fluid in chambers 43, 44 within housing 22.

According to an important feature of the invention, the slots 33b, 34b permit pivot pins 33a, 34a to shift as a function of the radius and angular displacement of the beam and sector gear links 35, 37, respectively, that are pivotally connected to fixed support plate 40. The lengths and locations of the beams 33, 34, and links 35, 37 and sector gears 39 are so calculated mathematically that the arc described by each beam 33, 34 is accurately cancelled by the arc generated by the corresponding sector gear link 37.

Figure 1:
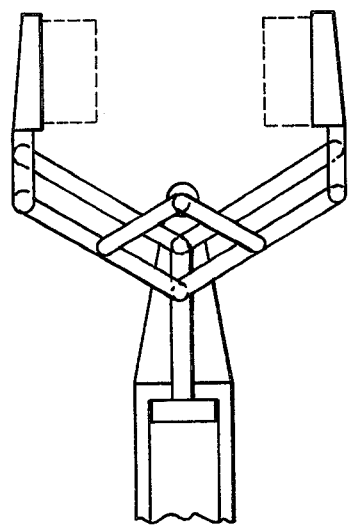
FIG. 1 is a side elevational view of a prior art clamping apparatus disclosed in Russian Pat. No. 568,542.
Figure 2:
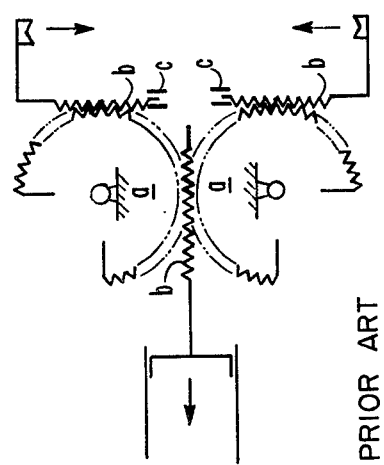
FIG. 2 is a schematic view of a prior art actuating mechanism shown in the Proceedings of the Fifth International Symposium on Industrial Robots held at the IIT Research Institute.

Note that according to the invention, the rack 41 acting through the sector gears 39 actuates only the links 37 to move the fingers 30 toward and away from each other; and that the ends of each pair of parallel beams 33, 34 merely float in their respective slots 33b, 34b. Thus, torque is imparted to beams 34 only by activating links 37 and this torque is, in turn, imparted to beams 33 via yokes 32 and links 35. By contrast, in the arrangement disclosed in the Russian patent (see FIG. 1 of this application), the piston acts directly on the respective one ends of both sets of parallel beams to position the fingers; no torque is imparted to the beams; and it is impossible to bring the finger surfaces close together as the piston is moved leftward as viewed in FIG. 1.

Note that the two sector gears 39 straddle rack 41, eliminating twisting moment on the finger beam assemblies. Also, since gears 39 engage opposite sides of the piston-driven rack 41, wear and backlash are minimized. Note also that fixed pivots 36, 38 and cylinder housing 22 are supported by plate 40.

A servo valve 45 controls the supply of hydraulic fluid under pressure to and release of fluid under pressure from chambers 43 and 44 to control the position of piston 42 and thereby of rack 41. Valve 45 may be of the conventional push-pull type comprising a torque motor 46. When torque motor 46 is deenergized, valve 45 will assume a lap position in which it seals off both chambers 43 and 44 from respective supply and discharge ports (not shown). When torque motor 46 is energized, valve 45 will operate to selectively admit fluid under pressure to one of the chambers 43 or 44 while simultaneously releasing fluid from the other chamber 44 or 43 according to the polarity of the signal delivered via line 47 from a two-loop analog servo control device 48. The degree of opening of one of the chambers 43 or 44 to the source of hydraulic fluid under pressure is directly linearly proportional to the current supplied to the torque motor 46. Thus, the degree of opening if the current is x will be doubled if the current is 2x; and the extent of movement of piston 42 and hence of rack 41 will be directly proportional to the current.

A linear potentiometer 50 is operatively coupled via a pin 51 to gear rack 41. Potentiometer 50 senses the position of piston 42 and provides, via a line 52, an analog feedback signal to servo control device 48 indicative of the position of piston 42 and hence of the fingers 30.

Device 48 comprises a digital-to-analog converter (DAC) 53 having its input connected via a line 54 to a microprocessor (not shown) and its output connected as an input to a summing junction 55. Line 52 is connected to an isolation follower 56 whose output is connected as the other input to summing junction 55. The output of junction 55 is connected via an operational amplifier 57 to another summing junction 58. The output of isolation follower 56 is also connected in parallel via a differentiator 59 to summing junction 58. The output of summing junction 58 is connected via operational amplifier and compensator 59A to line 47 that leads to the actuator servo valve 45.

Figure 5B:
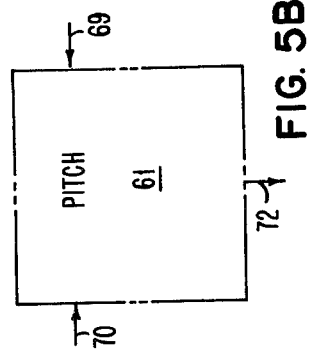
FIGS. 5A, 5B and 5C are block diagrams showing the signals for controlling yaw, pitch and roll actuator servo valves, respectively.
Figure 5C:
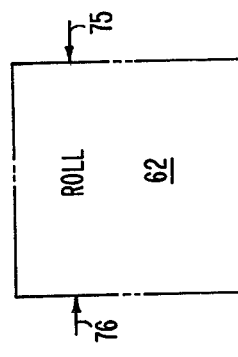
Figure 5A:
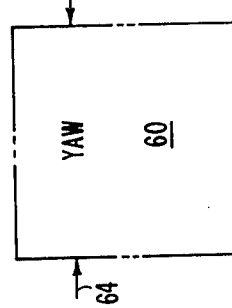

Referring now to FIGS. 5A, 5B and 5C, analog servo control devices 60, 61 and 62 are provided which internally are identical with device 48. Device 60 receives from the aforementioned microprocessor, via a line 63, a digital yaw position command. Device 60 converts this digital command signal to an analog signal and compares it with an analog signal fed back via a line 64 from a rotary potentiometer 65 (see FIG. 3) associated with the yaw actuator 13. Potentiometer 65 senses and provides an analog signal indicative of, the rotative position of yaw actuator output shaft 17. The output from device 60 is transmitted via a line 66 to a torque motor 67 that controls a servo valve 68.

Similarly, device 61 receives from the aforementioned microprocessor via a line 69 a digital pitch position command. Device 61 converts this digital command signal to an analog signal and compares it with an analog signal fed back via a line 70 from a rotary potentiometer 71 (see FIG. 3) associated with the pitch actuator 14. Potentiometer 71 senses, and provides an analog signal indicative of, the rotative position of yaw actuator output shaft 19. The output from device 61 is transmitted via a line 72 to a torque motor 73 that controls a servo valve 74.

In like manner, device 62 receives from the aforementioned microprocessor via a line 75 a digital roll position command. Device 62 converts this digital roll command signal to an analog signal and compares it with an analog signal fed back via a line 76 from a rotary potentiometer 77 (see FIG. 3) associated with the roll actuator 15. Potentiometer 77 senses, and provides an analog signal indicative of, the rotative position of roll actuator output shaft 21. The output from device 62 is transmitted via a line 78 to a torque motor 79 that controls a servo valve 80.

The servo valves 68, 74 and 80 are preferably identical with servo valve 45 and controlled in similar manner by respective torque motors 67, 73 and 79, except that the chambers are separated by vanes (as heretofore explained in connection with the description of actuators 13, 14 and 15) and the servo valve senses the rotative position of the vanes (and hence of the respective output shafts 17, 19 and 21) rather than the linear position of a piston, like the piston 42.

A light emitting diode (LED) 83 and photo diode (PD) 84 are embedded, as optical sensors, in and near the facing tips of the respective fingers 30 to denote the presence or absence of an article or object therebetween. LED 83 and PD 84 are encapsulated within a spherical body so that they may be optically aligned to each other before they are clamped into position.

Figure 6:
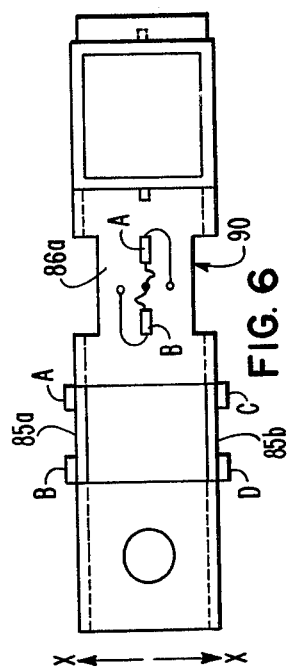
FIG. 6 is a side view, to enlarged scale, of a strain-gage-embodying flexure structure shown in FIG. 4 and forming part of the hand assembly.
Figure 7:
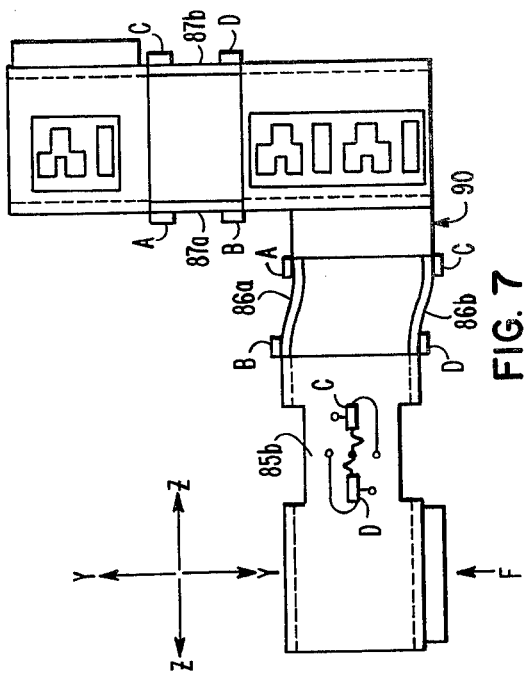
FIG. 7 is a top view, to the same scale as FIG. 6, depicting the flexure structure, with one set of strain gages being shown stressed under application of an applied force.

The fingers 30 are subjected to forces in three directions; i.e., X, Y and Z. The force supplied in the Y direction is usually the gripping force. The force supplied in the Z direction is usually used for fingertip sensing. Certain applications may also require force sensing in all three directions or any combination thereof. Force sensing in the X, Y and Z directions is, in accordance with a feature of the invention, accomplished by the three-axis force sensing flexure structure 90 associated with each finger 30. As illustrated in FIGS. 6 and 7, each force sensing structure 90 comprises three sets of flat parallel flexible beams 85a,b and 86a, b and 87a,b. Beams 85, 86, 87 are oriented with their respective plane surfaces perpendicular to the directions (X—X, Y—Y and Z—Z) of the respective force that each has been assigned to detect.

Figure 8:
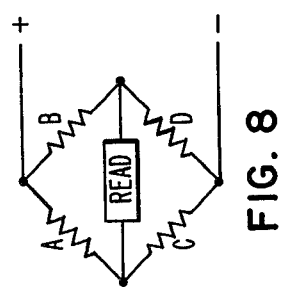
FIG. 8 is a schematic diagram of a Wheatstone bridge, showing the manner in which each strain gage measures strain in its assigned axis.

Each set 85, 86, 87 of flexible parallel beams constitutes part of the flexure structure 90 and is interposed between solid portions thereof. Strain gages A, B are bonded to beams 85a, 86a and 87a; and strain gages C, D are bonded to beams 85b, 86b and 87b, as illustrated. Each set of strain gages A, B, C, and D is connected as a full Wheatstone bridge (as shown in FIG. 8) to measure strains in the assigned direction as a direct function of beam deflection or force. By employing sets 85, 86, 87 of dual parallel beams (in place of single beams as taught in the prior art), splaying arc was reduced significantly, and the deflection to sense a 5 kilogram force in the Y direction was reduced drastically, for a given strain value. Also the coupling between the Y and Z axes was reduced significantly, the degree of reduction depending upon how well the bridges were electrically balanced.

Figure 9:
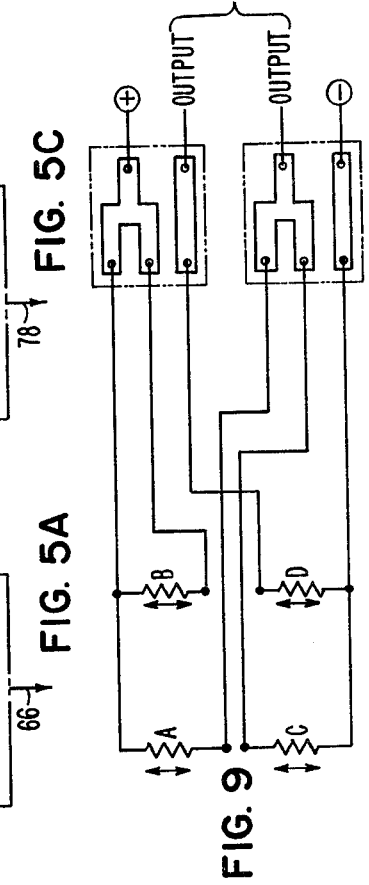
FIG. 9 is a schematic diagram depicting how the Wheatstone bridge circuit for each axis of freedom is connected to the associated terminal pads to measure strain output.

Assuming now that all bridges are electrically balanced and that a force F is applied in the Y direction, the force F will affect the Y and Z axis bridges, as illustrated in FIG. 7. As a result of the deflection of the Y axis beams 86a, b, strain gages A and D of the Y axis bridge will be subjected to a compressive stress, and strain gages B and C will be subjected simultaneously to a tensile stress. This will result in an unbalancing of the bridge and cause a polarized output voltage in the Y axis bridge. Meanwhile, at the Z axis bridge, strain gages A and B will be under compression, while strain gages C and D are under tension. Consequently, the bridge will remain balanced, causing the output voltage of the Z axis bridge to remain at 0, or effectively decoupled from the Y axis output. FIG. 9 illustrates the full Wheatstone bridge for each axis. Gages A, D are connected as illustrated to sense magnitude of compression; and gages B, C are connected as illustrated to sense magnitude of tension.

In operation, when an article is to be gripped, appropriate digital command signals will be given from the aforementioned microprocessor via lines 54, 63, 69, 75 to analog servo control devices 48, 60, 61, 62, respectively, for the respective hydraulic actuators. These digital command (set-point) signals will be fed to the DAC 53 at the input stage of the respective servo device 48, 60, 61 or 62. As fingers 30 approach the position called for by these command signals, the analog signal (transmitted via line 52, 64, 70 and/or 76) from the linear potentiometer 50 and/or rotary potentiometers 65, 71, 77 will null out the DAC voltage at summing junction 55 in the first stage of the respective servo device. Meanwhile, a signal proportional to velocity of the respective hydraulically controlled actuator will be generated by each operational amplifier differentiator 59 acting on the analog position signal fed back from its respective potentiometer. Each summing junction 58, which is inserted between the two operational amplifiers 57, 59, receives this velocity-proportional signal from the respective hydraulically controlled actuator; and each differentiator 59 acts in conjunction with the last stage operational amplifier and compensator 59A to stabilize the velocity and provide damping.

Meanwhile, the LED 83 and PD 84 sense the presence or absence of an article between the fingers 30; and the strain gages A, B, C, D forming part of the respective X, Y and Z axis bridges will sense, and provide a signal indicative of, the strain in the assigned direction. Suitably supported, adjustable limiting screws (not shown) are preferably provided so that the respective strain gages will not be damaged if a force in the X, Y and/or Z direction should exceed a predetermined magnitude such as 5 kilograms.

In accordance with an important feature of the invention, the fingers 30 will move rectilinearly toward each other throughout their excursion and the gripping surfaces 31 will remain parallel throughout such excursion, insuring that a constant gripping force will be applied to the article irrespective of the extent to which the fingers must be moved to make gripping contact.

While the invention has been shown and described with reference to a preferred embodiment thereof, it will be understood by those skilled in the art that changes in form and detail may be made therein without departing from the spirit, scope and teaching of the invention. Accordingly, the apparatus herein disclosed is to be considered merely as illustrative and the invention is to be limited only as specified in the claims.

I claim:

1. Gripper control apparatus comprising a pair of fingers having gripping surfaces for gripping an article, characterized by:
   four-bar linkage means, including a pair of arcuately movable parallel beams operatively connected to each of the fingers;
   a sector gear operatively connected to one of the beams of each pair for so controlling movement of the beams and fingers as to cause said gripping surfaces to concurrently move in rectilinearly aligned paths and remain parallel throughout their excursion during gripping and releasing of the article; and
   means, including a double-faced rack, for controlling concurrent movement of said sector gears.

2. Apparatus according to claim 1, further characterized in that said four-bar linkage means applies to the article a constant gripping force irrespective of the extent to which said fingers are moved toward each other to make gripping contact with the article.

3. Apparatus according to claim 1, wherein each sector gear is connected to said one beam of each pair by a link that generates an arc that substantially cancels out an arc described by the associated pair of parallel beams.

4. Apparatus according to claim 1, further characterized by:
   a flexure structure interposed between and operatively connecting each pair of beams with a respective one of the fingers, each flexure structure including three sets of dual flexible beams interposed between solid portions thereof; and
   strain gages associated with each set of dual flexible beams and interconnected in a bridge circuit to measure strain in three polar coordinate directions with minimal beam deflection and splaying arc.

5. Apparatus according to claim 1, including optical sensing means mounted on the fingers to sense the presence of an article therebetween.

6. Apparatus according to claim 1, including:
   means comprising a light emitting diode mounted on one of the fingers and a photo diode mounted on the other of the fingers for optically sensing the presence or absence of an article between said fingers, said diodes being encapsulated in spherical bodies so they may be aligned before being fixedly positioned.

7. Apparatus according to claim 1, further characterized by three rotary actuators, each for operatively driving and positioning the last-introduced means and thereby said fingers in a respective one of three polar coordinate directions;
   the first of said actuators having an output shaft for angularly positioning the second of said actuators which, in turn, has an output shaft for angularly positioning the third of said actuators which, in turn, angularly positions said last-introduced means;
   the axes of the three output shafts intersecting at a common point; and
   said three actuators controlling yaw, pitch and roll, respectively.

8. Article gripping apparatus comprising, in combination:
   two fingers for gripping an article;
   separate yoke means operatively connected to each finger;
   two pairs of parallel beams, those of each pair at their respective one ends being pivotally connected to a respective yoke means;
   link means pivotally connected to each beam intermediate its ends to permit arcuate movement of such beam relative to a respective fixed pivot;
   two sector gears, each rigidly connected to one of the link means associated with one of the beams of each pair;
   fixed means with which the opposite end of each of said beams has a pin-in-slot connection to operatively cause the arc described by each beam to be substantially cancelled by the arc generated by each of the sector gear-connected link means; and
   means for controlling concurrent arcuate movement of said sector gears for operatively causing said fingers to be moved rectilinearly throughout their excursion toward and away from each other.

9. Apparatus according to claim 8, wherein the fingers have gripping surfaces that are parallel to each other and are movable rectilinearly substantially at right angles to said surfaces under control of the parallel beams and link means to insure against splaying and insure that the gripping force applied to the article will be substantially constant irrespective of the extent to which said surfaces must be moved to make gripping contact with the article.

10. Apparatus according to claim 8, including means operatively connected to said controlling means for providing a signal indicative of the position of the fingers;
   means for conveying from a central processing unit or the like a command signal corresponding to a desired finger position; and
   servo means responsive to said signals for controlling velocity and direction of movement of said fingers.

11. Apparatus according to claim 8, including a wrist assembly comprising interconnected roll, pitch and yaw actuators operatively connected to said controlling means for imparting three degrees of freedom of movement thereto.

12. Apparatus according to claim 11, including
   servo means for controlling both the velocity and direction of movement of the wrist assembly and fingers; and
   means including four potentiometers, one for each of the actuators and one operatively connected to said controlling means, for generating signals indicative of the respective positions of the actuators and fingers for feedback to said servo means for controlling operation thereof.

13. Gripper control apparatus comprising a pair of fingers having gripping surfaces for gripping an article, characterized by:
   four-bar linkage means, including a pair of arcuately movable parallel beams operatively connected to each of the fingers, and a link connected to each beam intermediate its ends, said beams and links being pivotally connected to a fixed member; and
   means for operatively applying a force to at least one of the links of each pair for causing the arc described by each beam to be substantially cancelled by the arc generated by each link, thereby so controlling movement of the beams and fingers as to cause said gripping surfaces to concurrently move in rectilinearly aligned paths and remain parallel throughout their excursion during gripping and releasing of the article, and apply to the article a constant gripping force irrespective of the extent to which said fingers are moved toward each other to make gripping contact with the article.

* * * * *